United States Patent
Mangold et al.

(10) Patent No.: US 9,542,579 B2
(45) Date of Patent: Jan. 10, 2017

(54) FACILITATING GESTURE-BASED ASSOCIATION OF MULTIPLE DEVICES

(71) Applicant: Disney Enterprises, Inc., Burbank, CA (US)

(72) Inventors: Stefan Mangold, Liebefeld (CH);
Giorgio Corbellini, Zurich (CH);
Vladimir Vukadinovic, Zurich (CH);
Joshua D. Griffin, Pittsburgh, PA (US);
Matthew Trotter, Pittsburgh, PA (US)

(73) Assignee: DISNEY ENTERPRISES INC., Burbank, CA (US)

( * ) Notice: Subject to any disclaimer, the term of this patent is extended or adjusted under 35 U.S.C. 154(b) by 346 days.

(21) Appl. No.: 13/934,200

(22) Filed: Jul. 2, 2013

(65) Prior Publication Data

US 2015/0009116 A1  Jan. 8, 2015

(51) Int. Cl.
*G06F 3/01* (2006.01)
*G06K 7/10* (2006.01)

(52) U.S. Cl.
CPC .......... *G06K 7/10108* (2013.01); *G06F 3/017* (2013.01)

(58) Field of Classification Search
CPC ..................................... G06F 3/017
See application file for complete search history.

(56) References Cited

U.S. PATENT DOCUMENTS

| 7,809,789 | B2 | 10/2010 | Shuster | |
|---|---|---|---|---|
| 8,280,966 | B2 | 10/2012 | Steinhauer | |
| 8,522,330 | B2 | 8/2013 | Shuster | |
| 8,854,178 | B1 | 10/2014 | Mangold | |
| 2004/0263494 | A1* | 12/2004 | Poor et al. | ..................... 345/204 |
| 2006/0256074 | A1* | 11/2006 | Krum | ..................... G06F 1/1626 345/156 |
| 2007/0005835 | A1 | 1/2007 | Grant | |

(Continued)

OTHER PUBLICATIONS

Asadzadeh et al., "Real-time Gesture Recognition Using RFID Technology" 5th international Workshop on Pervasive Advertising (PerAd5) Jun. 2012.

(Continued)

*Primary Examiner* — Kenneth Bukowski
(74) *Attorney, Agent, or Firm* — Sheppard Mullin Richter & Hampton LLP

(57) ABSTRACT

Gesture-based association of multiple devices may be facilitated, which may effectuate presentation of content related to associated devices. Gesture detection may reduce or completely eliminate any ambiguity of whether the association is wanted or not. Some implementations may be employed in a theme park in which park guests wear an RFID wristband. During a park visit, when merchandise goods with embedded RFIDs are purchased (e.g., toys and/or other merchandise), the merchandise may be associated with the wristband and, therefore, the park guest wearing the wristband. Such association may give the theme park environment and/or the toy itself a mechanism to adapt their behavior depending on which toy the park guest is carrying. This may contribute to richer storytelling and personalized experiences, which may be realized by using location information, knowledge about the park guest's preferences or previous park visits, favorite attractions, age, language-specific information, and/or other information.

24 Claims, 2 Drawing Sheets

(56) References Cited

U.S. PATENT DOCUMENTS

| | | | |
|---|---|---|---|
| 2010/0070859 A1 | 3/2010 | Shuster | |
| 2010/0076970 A1 | 3/2010 | Bates | |
| 2010/0164946 A1 | 7/2010 | Hyndman | |
| 2012/0130717 A1 | 5/2012 | Xu | |
| 2012/0290950 A1 | 11/2012 | Rapaport | |
| 2014/0273849 A1* | 9/2014 | Lee et al. | 455/41.2 |
| 2015/0013004 A1 | 1/2015 | Mangold | |

OTHER PUBLICATIONS

Disney Club Penguin, http://www.clubpenguin.com/, screenshot printed May 25, 2012 (1 page).

Disney Pixie Hollow, http://pixiehollow.go.com/,screenshot printed May 23, 2012. (1 page).

Disney Pixie Hollow and Clickables. http;//www.wonderlandblog.com/wonderland/2008/03/disneys-pixie-h.html., accessed Jul. 13, 2011. online blog article, screenshot printed May 25, 2012 (1 page).

DJNative Swing Java Library. http://djproject.sourceforge.net/ns/index.html, accessed Jul. 19, 2011 screenshot printed May 25, 2012 (1 page).

Frigg, Roman (2011) "Design and Evaluation of Authentication Mechanisms for Networked Toys based on Shaking Patterns" (Draft 0.1). Bachelors Thesis. Jul. 2011. ETH Zurich. (126 pages).

Kumar, Arun et al. (2009) 'A comparative study of secure device pairing methods', Pervasive Mob. Comput. 5, (Dec. 6, 2009), 734-749, DOI=10.1016/j.pmcj.2009.07.008.

Mayrhofer, R. et al., (2009) 'Shake Well Before Use: Intuitive and Secure Pairing of Mobile Devices.' IEEE Trans. on Mob. Comput., vol. 8, No. 6, pp. 792-806, 2009.

Mayrhofer, R. et al., Shake well before use: authentication based on accelerometer data. Pervasive Computing, pp. 144-161, 2007.

Schmid, Stefan et al., Networking Smart Toys with Wireless ToyBridge and ToyTalk. In Poster Session, INfocom 2011, 2011. (2 pages).

Wang, Avery, An industrial strength audio search algorithm. ISMIR Proceedings, Baltimore, 2003. (7 pages).

* cited by examiner

FACILITATING GESTURE-BASED ASSOCIATION OF MULTIPLE DEVICES

FIELD OF THE DISCLOSURE

This disclosure relates to facilitating gesture-based association of multiple devices, which may effectuate presentation of content related to associated devices.

BACKGROUND

Associating devices using radio-frequency identification (RFID) technology is known. Typically, this is done by using an RFID reader to detect two RFID enabled devices one after the other, or together at the same time. The association of the two devices may be stored in a database. These and other existing approaches may be prone to unwanted associations because any two devices detected by the reader within a short predetermined period of time may be associated with each other.

SUMMARY

One aspect of the disclosure relates to a system configured to facilitate gesture-based association of multiple devices, in accordance with one or more implementations. Gesture detection may reduce or completely eliminate any ambiguity of whether the association is wanted or not. In exemplary implementations, the gesture detection described herein may allow association of devices to be part of a game, dance, sport exercise, and/or other physical activity. Ownership and/or association of devices may be changed by renewing the gesture procedure.

Some implementations may be employed in a theme park in which park guests wear an RFID wristband. During a park visit, when merchandise goods with embedded RFIDs are purchased (e.g., toys and/or other merchandise), the merchandise may be associated with the wristband and, therefore, the park guest wearing the wristband. Such association may give the theme park environment and/or the toy itself a mechanism to adapt their behavior depending on which toy the park guest is carrying. This may contribute to richer storytelling and personalized experiences, which may be realized by using location information, knowledge about the park guest's preferences or previous park visits, favorite attractions, age, language-specific information, and/or other information.

In some implementations, the system may include two or more devices. A given device may be configured to emit a wireless signal conveying information associated with an identification of that device. Individual ones of the devices may be configured to be portable as well as handheld and/or wearable. Examples of handheld devices may include toys, merchandise, trinkets, accessories, personal computing platforms (e.g., Smartphones), and/or other handheld devices. Examples of wearable devices 102 may include wristbands, bracelets, rings, pins, anklets, clothing, and/or other wearable items.

Individual ones of the devices may be configured to emit a wireless signal responsive to being subjected to an electromagnetic field of a given frequency. According to various implementations, the given frequency may include a single frequency, multiple frequencies, and/or a range of frequencies. The given frequency may include a radio frequency and/or other frequency regimes. In some implementations, individual ones of the devices may include an RFID tag.

The system may include one or more sensors. The sensor(s) may be configured to receive signals emitted by individual ones of the devices via wireless non-contact data transfer. According to some implementations, the wireless non-contact data transfer may be performed using radio-frequency electromagnetic fields. Individual ones of the sensor(s) may include RFID readers. In some implementations, individual ones of the sensor(s) may be stationary. For example, a given sensor may be disposed on a post anchored to the ground. In some implementations, individual ones of the sensor(s) may be mobile. For example, a given sensor may be disposed on a ride in a theme park.

According to some implementations, movement of a device may be determined using electromagnetic power and/or phase measurements. For example, when standing near an RFID scanner, a typical movement of a hand with two devices (e.g., with a toy in the hand and a wristband on the corresponding wrist) may enable the system to identify two similar patterns and hence match them. The system may associate the two devices (e.g., the toy and the wristband) with each other and store this association in a database. In some implementations, a unique pattern may be defined by a user by moving a device in a particular manner or gesture. That device may then be moved similarly to match the previously defined pattern in the gesture. Ambiguities and/or cross-correlation effects with other patterns may be handled by the system.

Any gesture or movement (e.g., shaking, swiping, dancing, and/or other movements) of a device proximal to a sensor may yield a signature pattern comprising received signal power as a function of time and/or received signal phase as a function of time. For 915 MHz RFID tags, received signal power and/or signal phase at an RFID reader of a sensor may be the measurement parameter to detect gestures. For 13.56 MHz RFID tags, phase measurements may be of limited value because phase may not vary much over the range of human movement with a wavelength of about twenty-two meters. Simple gestures such as wrist movements from the left side to the right side of a 13.56 MHz RFID reader can be measured, stored, and compared to other gestures.

Human gesture may be measured accurately because humans move slowly relative to sensing technology frequencies employed in the sensor(s). Some different gestures may be measured the same using a single sensor. For example, a side-to-side gesture could be confused with an in-out gesture. A single sensor may measure low power first, high power second, and then low power again. Some implementations may include N+1 sensors for an N-dimensional gesture space. For example, according to some implementations, for 2-D gestures, three sensors may be mounted in front of a user.

In some implementations, instead of gesture detection, mobility of one or more devices inside a geographical area (e.g., a theme park) may be tracked using multiple sensors distributed in the area. If the trajectories of two devices match, an association may be established.

The system may include one or more server(s). The server(s) may be configured to execute one or more computer program modules. The computer program modules may include one or more of a signal receipt module, a pattern extraction module, a device association module, a content provisioning module, and/or other modules.

The signal receipt module may be configured to receive signals from one or more of the sensor(s). The received signals may include signals and/or related signals emitted by individual ones of the devices. The received signals may include signals that convey information associated with an identification of individual devices including a first device and a second device. An identification may relate to a theme of a given device, an owner and/or purchaser of a given device, a family and/or other group associated with a given device, geographic information and/or network information associated with a given device and/or a given sensor, a history of usage of a given device, and/or other information. By way of non-limiting example, a theme of a given device may include a character associated with the given device, "friends" of the character, a brand associated with the given device, and/or other information. To illustrate, a toy figurine may be associated with identification information including a name of "Buzz Lightyear" who is friends with Woody and a brand of "Toy Story." An identification associated with an owner and/or purchaser of a given device may include a name, an age, a gender, other demographic information, play preferences and/or history of activities in a theme park and/or other location, and/or other information.

The pattern extraction module may be configured to determine patterns associated with individual signals received from one or more of the sensors. Individual patterns may be expressed as one or both of signal power as a function of time or signal phase as a function of time. Fluctuations in signal power and/or phase as a function of time may occur due to relative motion between a given device and a given sensor. A first pattern associated with a first wireless signal may be generated responsive to relative motion between the first device and a first sensor. A second pattern associated with a second wireless signal may be generated responsive to relative motion between the second device and a first sensor. By way of non-limiting example, a user holding a device may move and/or shake her hand, or a user wearing a device may move about to effectuate the relative motion between the device and a corresponding sensor. Multiple sensors may be invoked to generate a given pattern. For example, the first pattern associated with the first wireless signal may be generated responsive to relative motion between the first device and both the first sensor and a second sensor. The patterns may exhibit features with frequencies between about two to ten Hertz, which corresponds to normal rates of human motion.

The device association module may be configured to associate multiple ones of the two or more devices by determining whether the multiple ones moved together in a common gesture based on the patterns determined by the pattern extraction module. That is, the first device may be associated with the second device responsive to a determination that the first pattern matches the second pattern during a period of time. According to various implementations, the period of time may be between about one and ten seconds. However, other period durations are contemplated and are within the scope of the disclosure. By way of non-limiting example, moving the multiple ones of the two or more devices together in a common gesture may be achieved by moving a hand in space while the hand is holding the first device and the second device is attached to the corresponding wrist. The first pattern and the second pattern may be considered as being "matching" where, over a given period of time, the two patterns precisely match each other or approximately match each other, in accordance with various implementations.

The content provisioning module may be configured to provide content for presentation to users based on the association of the multiple ones of the two or more devices. For example, first content may be provided for presentation to a first user responsive to the first device being associated with the second device. The content may include visual media content, audio media content, tactile media content, and/or other media content. The presented content may be related to an identity of one or more devices. The content may be provided for presentation to a given user by (1) one or more devices in possession and/or otherwise associated with the given user, (2) one or more media presentation platforms proximal to the given user, and/or other devices and/or platforms. Users of devices may not own and/or possess the media presentation platform(s). A given media presentation platform may be installed in a theme park, a cruise ship, a hotel room, a private residence, a commercial location, and/or other locations. By way of non-limiting example, media presentation platform(s) may include or more of a display apparatus configured to present visual information, an audio apparatus configured to present audio information, and/or other platforms configured for media presentation.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
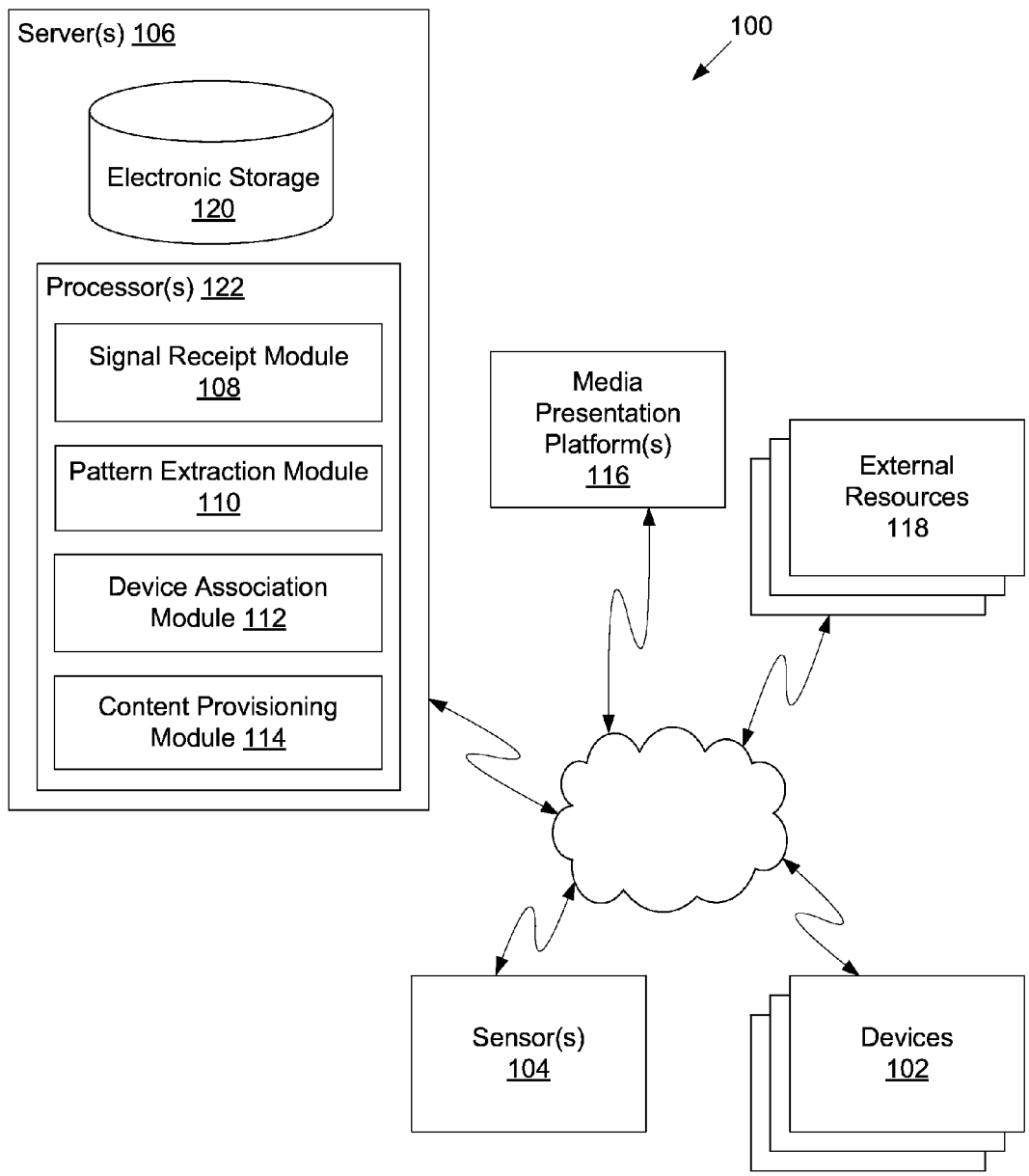
FIG. 1 illustrates a system configured to facilitate gesture-based association of multiple devices, in accordance with one or more implementations.

FIG. 1 illustrates a system 100 configured to facilitate gesture-based association of multiple devices, in accordance with one or more implementations. In some implementations, system 100 may include two or more devices 102. A given device 102 may be configured to emit a wireless signal conveying information associated with an identification of that device 102. Individual ones of the devices 102 may be configured to be portable as well as handheld and/or wearable. Examples of handheld devices 102 may include toys, merchandise, trinkets, accessories, personal computing platforms (e.g., Smartphones), and/or other handheld devices. Examples of wearable devices 102 may include wristbands, bracelets, rings, pins, anklets, clothing, and/or other wearable items.

Individual ones of the devices 102 may be configured to emit a wireless signal responsive to being subjected to an electromagnetic field of a given frequency. According to various implementations, the given frequency may include a single frequency, multiple frequencies, and/or a range of frequencies. The given frequency may include a radio frequency and/or other frequency regimes. In some implementations, individual ones of the devices 102 may include an RFID tag.

In some implementations, one or more of the devices 102 may include a motion detection device and/or a wireless transmitter. By way of non-limiting example, the motion detection device may include one or more of an accelerometer, a magnetometer, a gyroscope, and/or other motion detection device. The motion detection device may be configured to provide a motion signal conveying information associated with motions undergone by the device 102 containing the motion detection device. The wireless transmitter, passive RFID tag, and/or other transmitter may be configured to transmit a signal including the motion signal and information associated with the identification of the device 102. The wireless transmitter may include one or more of a wireless local area network (e.g., Wi-Fi™) transmitter, a wireless personal area network (e.g., Bluetooth™) transmitter, a cellular transmitter, and/or other wireless transmitters.

The system 100 may include one or more sensors 104. The sensor(s) 104 may be configured to receive signals emitted by individual ones of the devices 102 via wireless non-contact data transfer. According to some implementations, the wireless non-contact data transfer may be performed using radio-frequency electromagnetic fields. Individual ones of the sensor(s) 104 may include RFID readers. In some implementations, individual ones of the sensor(s) 104 may be stationary. For example, a given sensor 104 may be disposed on a post anchored to the ground. In some implementations, individual ones of the sensor(s) 104 may be mobile. For example, a given sensor 104 may be disposed on a ride in a theme park.

According to some implementations, movement of a device 102 may be determined using electromagnetic power and/or phase measurements. For example, when standing near an RFID scanner, a typical movement of a hand with two devices 102 (e.g., with a toy in the hand and a wristband on the corresponding wrist) may enable system 100 to identify two similar patterns and hence match them. The system may associate the two devices 102 (e.g., the toy and the wristband) with each other and store this association in a database. In some implementations, a unique pattern may be defined by a user by moving a device 102 in a particular manner or gesture. That device 102 may then be moved similarly to match the previously defined pattern in the gesture. Ambiguities and/or cross-correlation effects with other patterns may be handled by system 100.

Any gesture or movement (e.g., shaking, swiping, dancing, and/or other movements) of a device 102 proximal to a sensor 104 may yield a signature pattern comprising received signal power as a function of time and/or received signal phase as a function of time. For 915 MHz RFID tags, received signal power and/or signal phase at an RFID reader of a sensor 104 may be the measurement parameter to detect gestures. For 13.56 MHz RFID tags, phase measurements may be of limited value because phase may not vary much over the range of human movement with a wavelength of about twenty-two meters. Simple gestures such as wrist movements from the left side to the right side of a 13.56 MHz RFID reader can be measured, stored, and compared to other gestures. While RFID and Wi-Fi™ is discussed herein, this is not intended to be limiting as other technologies are contemplated and within the scope of the disclosure. For example, UHF or microwave frequency technologies may be used in some implementations.

Human gesture may be measured accurately because humans move slowly relative to sensing technology frequencies employed in sensor(s) 104. Some different gestures may be measured the same using a single sensor 104. For example, a side-to-side gesture could be confused with an in-out gesture. A single sensor 104 may measure low power first, high power second, and then low power again. Some implementations may include N+1 sensors 104 for an N-dimensional gesture space. For example, according to some implementations, for 2-D gestures, three sensors 104 may be mounted in front of a user.

In some implementations, instead of gesture detection, mobility of one or more devices 102 inside a geographical area (e.g., a theme park) may be used to determine a spatial pattern using multiple sensors 104 distributed in the area and an identification time-series of the one or more devices 102. For example, if the location of the multiple sensors 104 is known, then simply recording an ID of a given device 102 and the time it was read at individual ones of the multiple sensors 104 may yield a spatial pattern of the given device 104. If the spatial pattern trajectories of two devices 102 match, an association between those two devices 102 may be established. Mobility of one or more devices 102 may be caused by ambulatory motion of a user carrying the one or more devices 102 (e.g., a user walking through a theme park while holding one device 102 and wearing another device 102), motion of a theme park ride on which a user carrying the one or more devices is riding (e.g., a user riding a theme park ride while holding one device 102 and wearing another device 102), and/or other mobility inside a geographical area.

The system 100 may include one or more server(s) 106. The server(s) 106 may be configured to execute one or more computer program modules. The computer program modules may include one or more of a signal receipt module 108, a pattern extraction module 110, a device association module 112, a content provisioning module 114, and/or other modules.

The signal receipt module 108 may be configured to receive signals from one or more of the sensor(s) 104. The received signals may include signals and/or related signals emitted by individual ones of the devices 102. The received signals may include signals that convey information associated with an identification of individual devices 102 including a first device 102 and a second device 102. An identification may relate to a theme of a given device 102, an owner and/or purchaser of a given device 102, a family and/or other group associated with a given device 102, geographic information and/or network information associated with a given device 102 and/or a given sensor 104, a history of usage of a given device 102, and/or other information. By way of non-limiting example, a theme of a given device 102 may include a character associated with the given device 102, "friends" of the character, a brand associated with the given device 102, and/or other information. To illustrate, a toy figurine may be associated with identification information including a name of "Buzz Lightyear" who is friends with Woody and a brand of "Toy Story." An identification associated with an owner and/or purchaser of a given device 102 may include a name, an age, a gender, other demographic information, play preferences and/or history of activities in a theme park and/or other location, and/or other information.

In some implementations, a given device 102 may be configured to store information associated with motion undergone by that given device 102. Such information may be stored in non-transitory computer-readable storage media included in the given device 102. The signal receipt module 108 may be configured to receive signals from individual ones of the devices 102. The signals received from individual ones of the devices 102 may convey information associated with one or both of an identification of the given device 102 or motion undergone by the given device 102.

The pattern extraction module 110 may be configured to determine patterns associated with individual signals received from one or more of the sensors 104. Individual patterns may be expressed as one or both of signal power as a function of time or signal phase as a function of time. Fluctuations in signal power and/or phase as a function of time may occur due to relative motion between a given device 102 and a given sensor 104. A first pattern associated with a first wireless signal may be generated responsive to relative motion between the first device 102 and a first sensor 104. A second pattern associated with a second wireless signal may be generated responsive to relative motion between the second device 102 and a first sensor 102. By way of non-limiting example, a user holding a device 102 may move and/or shake her hand, or a user wearing a device 102 may move about to effectuate the relative motion between the device 102 and a corresponding sensor 104. Multiple sensors 104 may be invoked to generate a given pattern. For example, the first pattern associated with the first wireless signal may be generated responsive to relative motion between the first device 102 and both the first sensor 104 and a second sensor 104. The patterns may exhibit features with frequencies between about two to ten Hertz, which corresponds to normal rates of human motion.

The device association module 112 may be configured to associate multiple ones of the two or more devices 102 by determining whether the multiple ones moved together in a common gesture based on the patterns determined by the pattern extraction module 110. That is, the first device 102 may be associated with the second device 102 responsive to a determination that the first pattern matches the second pattern during a period of time. According to various implementations, the period of time may be between about one and ten seconds. However, other period durations are contemplated and are within the scope of the disclosure. By way of non-limiting example, moving the multiple ones of the two or more devices 102 together in a common gesture may be achieved by moving a hand in space while the hand is holding the first device 102 and the second device 102 is attached to the corresponding wrist. The first pattern and the second pattern may be considered as being "matching" where, over a given period of time, the two patterns precisely match each other or approximately match each other, in accordance with various implementations.

The content provisioning module 114 may be configured to provide content for presentation to users based on the association of the multiple ones of the two or more devices. For example, first content may be provided for presentation to a first user responsive to the first device being associated with the second device. The content may include visual media content, audio media content, tactile media content, and/or other media content. The presented content may be related to an identity of one or more devices 102. The content may be provided for presentation to a given user by (1) one or more devices 104 in possession and/or otherwise associated with the given user, (2) one or more media presentation platforms 116 proximal to the given user, and/or other devices and/or platforms. Users of devices 102 may not own and/or possess media presentation platform(s) 116. A given media presentation platform 116 may be installed in a theme park, a cruise ship, a hotel room, a private residence, a commercial location, and/or other locations. By way of non-limiting example, media presentation platform(s) 116 may include one or more of a display apparatus configured to present visual information, an audio apparatus configured to present audio information, and/or other platforms configured for media presentation.

In some implementations, devices 102, sensor(s) 104, server(s) 106, media presentation platform(s) 116, external resources 118, and/or other components of system 100 may be operatively and/or communicatively linked via one or more electronic communication links. For example, such electronic communication links may be established, at least in part, via a network such as the Internet, Wi-Fi™, and/or other networks. As another example, devices 102 and sensor(s) 104 may be communicatively linked via radio frequency communication (e.g., RFID technology). It will be appreciated that this is not intended to be limiting, and that the scope of this disclosure includes implementations in which devices 102, sensor(s) 104, server(s) 106, media presentation platform(s) 116, external resources 118, and/or other components of system 100 may be operatively and/or communicatively linked via some other communication media.

A given device 102 may include one or more processors configured to execute computer program modules. The computer program modules may be configured to enable an expert or user associated with the given device 102 to interface with system 100 and/or external resources 118, and/or provide other functionality attributed herein to devices 102. The given device 102 may have an RFID tag embedded therein or affixed thereto By way of non-limiting example, the given device 102 may include one or more of a handheld computer, a tablet computing platform, a NetBook, a Smartphone, a portable gaming console, an electronic toy, a plush toy, other toys, and/or other devices.

External resources 118 may include sources of information, hosts and/or providers of media content outside of system 100, external entities participating with system 100, and/or other resources. In some implementations, some or all of the functionality attributed herein to external resources 118 may be provided by resources included in system 100.

Server(s) 106 may include electronic storage 120, one or more processors 122, and/or other components. Server(s) 106 may include communication lines, or ports to enable the exchange of information with a network and/or other computing platforms. Illustration of server(s) 106 in FIG. 1 is not intended to be limiting. Server(s) 106 may include a plurality of hardware, software, and/or firmware components operating together to provide the functionality attributed herein to server(s) 106. For example, server(s) 106 may be implemented by a cloud of computing platforms operating together as server(s) 106.

Electronic storage 120 may comprise non-transitory storage media that electronically stores information. The electronic storage media of electronic storage 120 may include one or both of system storage that is provided integrally (i.e., substantially non-removable) with server(s) 106 and/or removable storage that is removably connectable to server(s) 106 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 106, information received from devices 102, information received from sensor(s) 104, and/or other information that enables server(s) 106 to function as described herein.

The processor(s) 122 are configured to provide information processing capabilities in server(s) 106. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. The processor(s) 122 may be configured to execute modules 108, 110, 112, 114, and/or other modules. The processor(s) 122 may be configured to execute modules 108, 110, 112, 114, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, and 114 are illustrated in FIG. 1 as being implemented within a single processing unit, in implementations in which processor(s) 122 includes multiple processing units, one or more of modules 108, 110, 112, and/or 114 may be implemented remotely from the other modules. The description of the functionality provided by the different modules 108, 110, 112, and/or 114 described below is for illustrative purposes, and is not intended to be limiting, as any of modules 108, 110, 112, and/or 114 may provide more or less functionality than is described. For example, one or more of modules 108, 110, 112, and/or 114 may be eliminated, and some or all of its functionality may be provided by other ones of modules 108, 110, 112, and/or 114. As another example, processor(s) 122 may be configured to execute one or more additional modules that may perform some or all of the functionality attributed below to one of modules 108, 110, 112, and/or 114.

Figure 2:
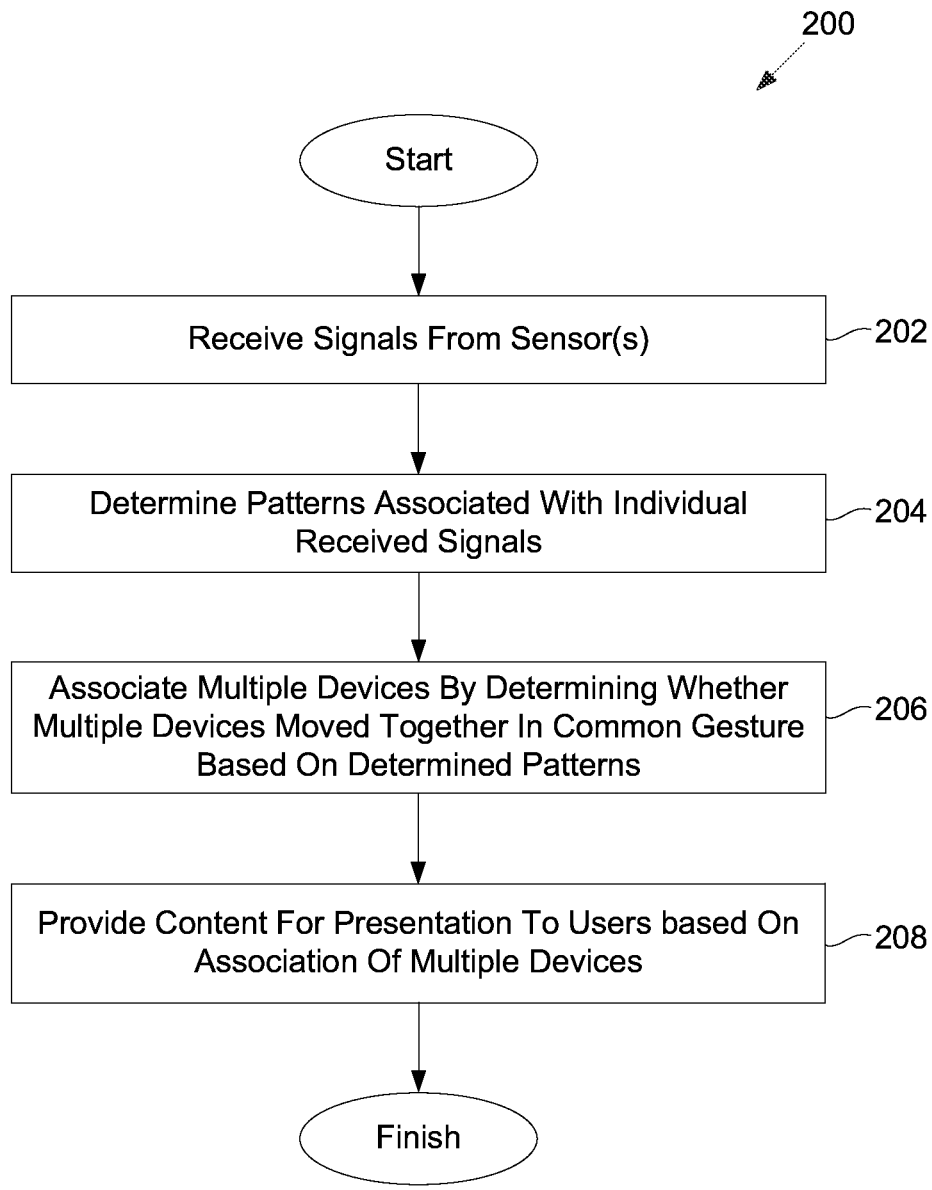
FIG. 2 illustrates a method to facilitate gesture-based association of multiple devices, in accordance with one or more implementations.

FIG. 2 illustrates a method 200 to facilitate gesture-based association of multiple devices, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation, signals may be received from one or more sensors (e.g., sensor(s) 104). The one or more sensors may be configured to receive signals emitted by two or more devices (e.g., devices 102) via wireless non-contact data transfer. The two or more devices may include a first device and a second device. The first device may be configured to emit a first wireless signal conveying information associated with an identification of the first device. The second device may be configured to emit a second wireless signal conveying information associated with an identification of the second device. Individual ones of the two or more devices may be configured to be portable as well as handheld and/or wearable. Operation 202 may be performed by one or more processors configured to execute a signal receipt module that is the same as or similar to signal receipt module 108, in accordance with one or more implementations.

At an operation 204, patterns associated with individual signals received from the one or more sensors may be determined. Individual patterns may be expressed as one or both of signal power as a function of time or signal phase as a function of time. A first pattern associated with the first wireless signal may be generated responsive to relative motion between the first device and a first sensor. A second pattern associated with the second wireless signal may be generated responsive to relative motion between the second device and the first sensor. Operation 204 may be performed by one or more processors configured to execute a pattern extraction module that is the same as or similar to pattern extraction module 110, in accordance with one or more implementations.

At an operation 206, multiple ones of the two or more devices may be associated by determining whether the multiple ones moved together in a common gesture based on the determined patterns. The first device may be associated with the second device responsive to a determination that the first pattern matches the second pattern during a period of time. Operation 206 may be performed by one or more processors configured to execute a device association module that is the same as or similar to device association module 110, in accordance with one or more implementations.

At an operation 208, content may be provided for presentation to users based on the association of the multiple ones of the two or more devices. First content may be provided for presentation to a first user responsive to the first device being associated with the second device. Operation 208 may be performed by one or more processors configured to execute a content provisioning module that is the same as or similar to content provisioning module 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate gesture-based association of multiple devices, the system comprising:
non-transitory storage media storing machine-readable instructions; and
one or more physical processors configured by the machine-readable instructions to:
obtain signals from one or more sensors, the one or more sensors being embodied within one or more support structures, the one or more sensors being configured to receive signals emitted by two or more devices via wireless non-contact data transfer, individual ones of the one or more support structures being separate and distinct from the two or more devices, individual ones of the two or more devices being configured to be portable, such that:
the two or more devices include a first device and a second device, the first device being configured to emit a first wireless signal conveying information associated with an identification of the first device, the second device being configured to emit a second wireless signal conveying information associated with an identification of the second device;
the one or more support structures include a first support structure, the first support structure including a first sensor, the first wireless signal being obtained from the first sensor based on the first sensor receiving the first wireless signal emitted from the first device, and the second wireless signal being obtained from the first sensor based on the first sensor receiving the second wireless signal emitted from the second device; and
wherein the first support structure is separate and distinct from the first device and the second device;
determine patterns associated with individual signals received from the one or more sensors of the one or more support structures, individual patterns being expressed as one or both of signal power as a function of time or signal phase as a function of time, individual patterns being generated responsive to relative motion between individual ones of the two or more devices and individual ones of the one or more sensors while individual ones of the one or more sensors receive the wireless signals emitted from individual ones of the two or more devices, such that:
a first pattern associated with the first wireless signal is determined, the first pattern being generated responsive to relative motion between the first device and the first sensor of the first support structure while the first sensor receives the first wireless signal emitted from the first device, the first pattern being a unique pattern defined by a user by moving the first device relative to the first support structure in a particular manner or gesture; and
a second pattern associated with the second wireless signal is determined, the second pattern being generated responsive to relative motion between the second device and the first sensor of the first support structure while the first sensor receives the second wireless signal emitted from the second device; and associate multiple ones of the two or more devices by determining whether the multiple ones moved together in a common manner or gesture based on the determined patterns, the first device being associated with the second device responsive to a determination that the first device and second device moved together in the particular manner or gesture based on the second pattern matching the first pattern during a period of time.

2. The system of claim 1, wherein individual ones of the two or more devices are configured to be either handheld or wearable, the first device being handheld and the second device being wearable.

3. The system of claim 2, wherein the first device is toy and the second device is a wristband.

4. The system of claim 1, wherein the first device is configured to emit the first wireless signal responsive to being subjected to an electromagnetic field of a first frequency.

5. The system of claim 4, wherein the first frequency is a radio frequency.

6. The system of claim 1, wherein one or both of the first device or the second device includes an RFID tag.

7. The system of claim 1, wherein the first device includes a motion detection device and a wireless transmitter, the motion detection device being configured to provide a motion signal conveying information associated with motions undergone by the first device, the wireless transmitter being configured to transmit the first signal, the first signal including the motion signal and information associated with the identification of the first device, the motion detection device including one or both of an accelerometer, a magnetometer, or a gyroscope.

8. The system of claim 7, wherein the wireless transmitter includes one or more of a wireless local area network transmitter, a wireless personal area network transmitter, or a cellular transmitter.

9. The system of claim 1, wherein individual ones of the one or more support structures are stationary.

10. The system of claim 1, wherein the wireless non-contact data transfer is performed using radio-frequency electromagnetic fields.

11. The system of claim 1, wherein individual ones of the one or more sensors are RFID readers.

12. The system of claim 1, wherein the relative motion between a given device and a given sensor is caused by a user moving or shaking the given device proximal to the given sensor.

13. The system of claim 1, wherein the first pattern associated with the first wireless signal is generated responsive to relative motion between the first device and both the first sensor and a second sensor, the second sensor being embodied within the first support structure.

14. The system of claim 1, wherein the patterns exhibit features with frequencies between about two to ten Hertz.

15. The system of claim 1, wherein moving the multiple ones of the two or more devices together in a common gesture is achieved by moving a hand in space while the hand is holding the first device and the second device is attached to the corresponding wrist.

16. The system of claim 1, wherein moving the multiple ones of the two or more devices together in a common gesture is achieved by shared mobility of the multiple devices inside a geographical area.

17. The system of claim 16, wherein the shared mobility of the multiple devices is caused by one or both of (1)

ambulatory motion of a user carrying the multiple devices or (2) motion of a theme park ride on which a user carrying the multiple devices is riding.

18. The system of claim 1, wherein the period of time during which the first pattern matches the second pattern is between about one and ten seconds.

19. The system of claim 1, wherein the one or more physical processors are further configured by machine-readable instructions to provide content for presentation to users based on the association of the multiple ones of the two or more devices, first content being provided for presentation to a first user responsive to the first device being associated with the second device.

20. The system of claim 1, wherein the one or more physical processors are further configured by machine-readable instructions to receive signals from individual ones of the two or more devices, the signal received from a given one of the two or more devices conveying information associated with one or both of an identification of the given device or motion undergone by the given device.

21. A computer-implemented method to facilitate gesture-based association of multiple devices, the method being implemented in a computer system comprising one or more physical processors and non-transitory storage media storing machine-readable instructions, the method comprising:
    obtaining signals from one or more sensors, the one or more sensors being embodied within one or more support structures, the one or more sensors being configured to receive signals emitted by two or more devices via wireless non-contact data transfer, individual ones of the one or more support structures being separate and distinct from the two or more devices, individual ones of the two or more devices being configured to be portable, such that:
        the two or more devices include a first device and a second device, the first device being configured to emit a first wireless signal conveying information associated with an identification of the first device, the second device being configured to emit a second wireless signal conveying information associated with an identification of the second device;
        the one or more support structures include a first support structure, the first support structure including a first sensor, the first wireless signal being obtained from the first sensor based on the first sensor receiving the first wireless signal emitted from the first device, and the second wireless signal being obtained from the first sensor based on the first sensor receiving the second wireless signal emitted from the second device; and
        wherein the first support structure is separate and distinct from the first device and the second device;
    determining patterns associated with individual signals received from the one or more sensors of the one or more support structures, individual patterns being expressed as one or both of signal power as a function of time or signal phase as a function of time, individual patterns being generated responsive to relative motion between individual ones of the two or more devices and individual ones of the one or more sensors while individual ones of the one or more sensors receive the wireless signals emitted from individual ones of the two or more devices, including:
        determining a first pattern associated with the first wireless signal, the first pattern being generated responsive to relative motion between the first device and the first sensor of the first support structure while the first sensor is receiving the first wireless signal emitted from the first device, the first pattern being a unique pattern defined by a user by moving the first device relative to the first support structure in a particular manner or gesture; and
        determining a second pattern associated with the second wireless signal, the second pattern being generated responsive to relative motion between the second device and the first sensor of the first support structure while the first sensor receives the second wireless signal emitted from the second device; and
    associating multiple ones of the two or more devices by determining whether the multiple ones moved together in a common manner or gesture based on the determined patterns, the first device being associated with the second device responsive to a determination that the first device and second device moved together in the particular manner or gesture based on the second pattern matching the first pattern during a period of time.

22. The method of claim 21, wherein the relative motion between a given device and a given sensor is caused by a user moving or shaking the given device proximal to the given sensor.

23. The method of claim 21, further comprising providing content for presentation to users based on the association of the multiple ones of the two or more devices, first content being provided for presentation to a first user responsive to the first device being associated with the second device.

24. A system configured to facilitate gesture-based association of multiple devices, the system comprising:
    non-transitory storage media storing machine-readable instructions; and
    one or more physical processors configured by the machine-readable instructions to:
        obtain signals from one or more sensors, the one or more sensors being embodied within one or more support structures, the one or more sensors being configured to receive signals transmitted by two or more devices via wireless non-contact data transfer, individual ones of the one or more support structures being separate and distinct from the two or more devices, individual ones of the two or more devices being configured to be portable, such that:
            the two or more devices include a first device and a second device, the first device being configured to transmit a first signal conveying information associated with an identification of the first device, the second device being configured to store information associated with motion of the second device and further configured to transmit a second signal conveying information associated with an identification of the second device and the motion of the second device; and
            the one or more support structures include a first support structure, the first support structure including a first sensor, the first wireless signal being obtained from the first sensor based on the first sensor receiving the first wireless signal emitted from the first device, and the second wireless signal being obtained from the first sensor based on the first sensor receiving the second wireless signal emitted from the second device; and wherein the first support structure is separate and distinct from the first device and the second device;

determine patterns associated with individual signals received from the one or more sensors of the one or more support structures and/or the devices, individual patterns being expressed as one or both of signal power as a function of time or signal phase as a function of time, individual patterns being generated responsive to relative motion between individual ones of the two or more devices and individual ones of the one or more sensors, such that:

a first pattern associated with the first signal is determined, the first pattern being generated responsive to relative motion between the first device and the first sensor of the first support structure while the first sensor is receiving the first wireless signal emitted from the first device, the first pattern being a unique pattern defined by a user by moving the first device relative to the first support structure in a particular manner or gesture; and a second pattern associated with the second signal is determined, the second pattern being generated responsive to motion of the second device while the first sensor is receiving the second wireless signal emitted from the second device; and associate multiple ones of the devices by determining whether the multiple ones moved together in a common gesture based on the determined patterns, the first device being associated with the second device responsive to a determination that the first device and second device moved together in the particular manner or gesture based on the second pattern matching the first pattern during a period of time.

* * * * *